(12) United States Patent
Ran-Ressler et al.

(10) Patent No.: US 12,433,316 B2
(45) Date of Patent: *Oct. 7, 2025

(54) COMPOSITIONS AND METHODS FOR TREATMENT OF EXOCRINE PANCREATIC INSUFFICIENCY (EPI)

(71) Applicant: SOCIETE DES PRODUITS NESTLE S.A., Vevey (CH)

(72) Inventors: Rinat Ran-Ressler, Bridgewater, NJ (US); David Stephane Philippe, Auboranges (CH); Jissy Jacob, Whitehouse Station, NJ (US)

(73) Assignee: Societe des Produits Nestle S.A., Vevey (CH)

( * ) Notice: Subject to any disclaimer, the term of this patent is extended or adjusted under 35 U.S.C. 154(b) by 805 days.

This patent is subject to a terminal disclaimer.

(21) Appl. No.: 17/277,586

(22) PCT Filed: Sep. 20, 2019

(86) PCT No.: PCT/EP2019/075322
§ 371 (c)(1),
(2) Date: Mar. 18, 2021

(87) PCT Pub. No.: WO2020/058474
PCT Pub. Date: Mar. 26, 2020

(65) Prior Publication Data
US 2021/0352951 A1    Nov. 18, 2021

Related U.S. Application Data

(60) Provisional application No. 62/734,339, filed on Sep. 21, 2018.

(51) Int. Cl.
| | | |
|---|---|---|
| *A23L 33/12* | (2016.01) | |
| *A23L 33/00* | (2016.01) | |
| *A23L 33/125* | (2016.01) | |
| *A23L 33/17* | (2016.01) | |
| *A61K 9/00* | (2006.01) | |
| *A61P 1/18* | (2006.01) | |
| *A61P 5/48* | (2006.01) | |

(52) U.S. Cl.
CPC .............. *A23L 33/40* (2016.08); *A23L 33/12* (2016.08); *A23L 33/125* (2016.08); *A23L 33/17* (2016.08)

(58) Field of Classification Search
CPC ........ A23L 33/40; A23L 33/12; A23L 33/125; A23L 33/17; A61K 9/0029; A61K 9/00; A61P 1/18; A61P 5/48
See application file for complete search history.

(56) References Cited

FOREIGN PATENT DOCUMENTS

| | | | |
|---|---|---|---|
| DE | 19644518 | 4/1998 | |
| EP | 2508180 | 10/2012 | |
| JP | 2013523871 A | 6/2013 | |
| WO | 0013689 | 3/2000 | |
| WO | 2011118810 A1 | 9/2011 | |
| WO | WO-2012136659 A1 * | 10/2012 | ........... A23L 1/3008 |
| WO | 2015063041 | 5/2015 | |
| WO | 2017117121 | 7/2017 | |

OTHER PUBLICATIONS

Google translation of DE 19644518, pp. 1-6. (Year: 1998).*
"MINTEL—Liquid Peptide-Based Food With Vanilla Flavour", Sep. 14, 2018, 3 pages, XP055651896.
Japanese Office Action for Appl No. 2021-507755 dated Jan. 9, 2024.
Japanese Office Action for Appl No. 2021-507755 dated Aug. 1, 2023.

* cited by examiner

*Primary Examiner* — Julie Ha
(74) *Attorney, Agent, or Firm* — K&L Gates LLP

(57) ABSTRACT

A method of treating exocrine pancreatic insufficiency includes administering to an individual in need thereof (e.g., an individual with cystic fibrosis) an effective amount of an enteral composition having a total protein consisting essentially of hydrolyzed protein and a total fat containing monoacylglycerols (MAG) that are at least about 30 wt. % of the total fat, and the total fat optionally further contains medium chain triglycerides (MCT) and/or fatty acids. In one particular non-limiting embodiment, about 60 wt. % of the total fat is from MCT and about 40 wt. % of the total fat is from MAG; in another particular non-limiting embodiment, the total fat is MAG with free fatty acids (esterified and/or bound) without MCT; and in yet another particular non-limiting embodiment, the total fat is MAG alone without MCT.

11 Claims, No Drawings

COMPOSITIONS AND METHODS FOR TREATMENT OF EXOCRINE PANCREATIC INSUFFICIENCY (EPI)

CROSS REFERENCE TO RELATED APPLICATIONS

The present application is a National Stage of International Application No. PCT/EP2019/075322, filed on Sep. 20, 2019, which claims priority to U.S. Provisional Patent Application No. 62/734,339, filed on Sep. 21, 2018, the entire contents of which are being incorporated herein by reference.

BACKGROUND

The present disclosure generally relates to nutritional compositions and methods that can treat Exocrine Pancreatic Insufficiency, for example in an individual with cystic fibrosis. The compositions are advantageously stable.

Normal pancreatic function ensures effective digestion of nutrients. Exocrine Pancreatic Insufficiency (EPI) occurs when secretions of the pancreatic enzymes fail to maintain normal digestive function, resulting in malabsorption (diarrhea) and, eventually, malnutrition. In children, growth and development may be compromised by EPI.

Indeed, patients with EPI have decreased secretion of digestion enzymes. Therefore, patients with EPI have limited ability to digest, absorb and utilize nutrients from food. Without appropriate treatment, patients with EPI are at high risk for malnutrition and experience low quality of life.

The most common causes of primary EPI are Cystic Fibrosis (CF) and Pancreatitis (Acute and Chronic) (Fieker, Philpott et al. 2011). In CF, more than 80% of the patients require pancreatic enzyme replacement therapy (PERT). While Chronic Pancreatitis often requires a low-fat diet, in progressive cases and in patients with low complaint, PERT is also prescribed. Additionally, non-pancreatic etiologies can cause EPI. These include gastrointestinal surgery, Celiac Disease (EPI can occur in one-third of these patients), Crohn's disease, and liver disease. Based on the European Federation of Pharmaceutical Industries and Associations, the overall frequency of EPI is between 3 and 4 cases per 1,000 hospital admissions.

A predigested formula in which the nutrients are pre-digested to overcome the lack of enzyme secretion can increase the availability of nutrients to these patients and improve their quality of life. However, such a formula is technically challenging: the practice today is to not add pancreatic enzymes into the food directly because it will digest the formula in an uncontrolled manner. Therefore, the formula must be pre-digested, but it is difficult to achieve a pre-digested fat and protein to a level that the patients can absorb, such as a high level of di- and tri-peptides. Furthermore, the sensory aspect of the formula is challenging because the hydrolyzed protein will contribute to the bitterness of the formula.

Moreover, the fat fraction which includes MAG is typically in paste form and susceptible to oxidation in the absence of high levels of anti-oxidants. BHT/BHA are normally used to protect against oxidation, but they are not allowed for young children.

In addition, pre-digested carbohydrates are mainly in their simple form (e.g., mono- and di-saccharides), which can potentially lead to a hyperosmolar formula, along with the use of peptides, medium chain triglycerides (MCT) and monacylglycerol (MAG).

In view of the above challenges, patients with EPI rely on consumption of PERT which requires them to consume several enzyme pills with every single meal. Even under PERT, many patients still experience malabsorption, especially of fat; and the patients are at risk for maldigestion, malnutrition, and loss of energy with stool. Additionally, the quality of life of these patients is also compromised.

Significant improvement in the treatment of patients with CF has increased their life expectancy. The current predicted survival age is close to 40, however the quality of life (QoL) of these patients is still an issue, and there are related gastrointestinal, metabolic and nutritional challenges (Roy 1988, Welsh 1987). Notably, patients with Cystic Fibrosis have high energy needs. In order to meet these needs, the patients often require nocturnal feeding via gastrostomy tube (G-tube). To maximize absorption during the night, the patients often need to consume PERT during the night as well. This is another challenge for patients with EPI and their caregiver.

Indeed, CF presents many nutritional challenges. In this regard, poor clinical outcomes in cystic fibrosis are often associated with undernutrition (Kalnins, 2012). Such patients have high caloric needs and cannot skip meals and snacks, which is very hard to achieve, and moreover night feeding may be necessary. As the afflicted child grows during childhood, calorie needs increase, but lung disease is also progressed and may compromise nutritional status and may affect appetite. Many CF patients need aggressive nutritional support; enteral tube feeding, usually delivered as overnight feeds with appropriate enzyme therapy, may provide approximately 30%-50% of estimated daily energy requirements.

PERT is used in nearly 85% of patients with CF. Nevertheless, steatorrhea in severe pancreatic insufficiency is very difficult to resolve completely, and only a 60%-70% reduction is usually achieved using PERT.

To the best knowledge of the present inventors, at the time of the inventions disclosed herein, there were no pre-digested nutritional products on the market specifically designed for EPI, let alone CF. Further in this regard, a long term consumption of low-fat diet is not recommended for individuals with EPI because it restricts caloric intake. Medium-chain triglycerides (MCTs) alone do not contain the essential fatty acids Linoleic acid (18:2n-6) and alpha-Linolenic acid (18:3n-3) and furthermore have poor palatability, high cost, and lower energy compared to LCTs and may also require enzyme supplements for proper digestion and absorption. Conventional thought is that MCTs should be used only in patients with persistence of symptoms or weight loss despite adequate enzyme supplementation, e.g., PERT non-responders. Finally, a diet rich in fiber content could be contraindicated in some CF patients because the fibrous material will interfere with proteolytic and amylolytic enzyme activity; lipolytic activity is most affected.

SUMMARY

The present inventors developed nutritional compositions to address the needs of patients with exocrine pancreatic insufficiency (EPI). The nutritional compositions are preferably subjected to aseptic ultra-high temperature treatment (UHT), such as indirect UHT or direct UHT, e.g., direct steam injection or steam infusion, and thus are shelf-stable.

In an embodiment, the present disclosure provides a method of treating exocrine pancreatic insufficiency, the method comprising administering to an individual in need thereof an effective amount of a nutritional composition having a total protein consisting essentially of hydrolyzed protein and a total fat comprising monoacylglycerols (MAG) that are at least about 20 wt. % of the total fat, preferably at least about 30 wt. % of the total fat, and optionally the total fat further comprises MCT and/or fatty acids. Optionally at least a portion of the hydrolyzed protein can be extensively hydrolyzed protein.

In an embodiment, the composition has at least one characteristic selected from the group consisting of: (i) an energy density of 1.0-2.5 kcal/ml, for example 1.0-2.0 kcal/ml, such as 1.0-1.5 kcal/ml; (ii) the total fat is about 10 to about 90 en. % of the composition; (iii) the MCT are about 1.0 wt. % to about 10.0 wt. % of the composition; (iv) the MAG are about 0.1 wt. % to about 10.0 wt. % of the composition; (v) the total protein is about 5 to about 50 en. % of the composition, preferably about 5 to about 40 en. % of the composition, more preferably about 5 to about 25 en. % of the composition; (vi) a total carbohydrates that is about 5 to about 85 en. % of the composition; and (vii) the total carbohydrates consist essentially of one or more of maltodextrin, maltose, high maltose corn syrup, fructose, galactose, lactose, maltotriose or sucrose and optionally comprise slowly digested carbohydrates such as isomaltulose or a mixture of thereof. Preferably, the composition comprises all of characteristics (i)-(vii).

In an embodiment, the composition is administered to the individual at least once daily for at least one week.

In an embodiment, the hydrolyzed protein is from at least one protein source selected from the group consisting of dairy protein, plant protein, in vitro-grown protein, fermented protein, insect protein, and microalgae protein, free amino acids, or a mixture of thereof.

The hydrolyzed protein can be partially hydrolyzed protein and/or partially hydrolyzed protein. In an embodiment the protein comprises hydrolyzed whey protein. In an embodiment the protein is hydrolyzed whey protein. In an embodiment, the protein includes extensively hydrolyzed whey protein. In an embodiment, the protein is extensively hydrolyzed whey In an embodiment, the total fat is selected from the group consisting of MAG, diacylglycerols (DAG), long chain triglycerides (LCT), medium chain triglycerides (MCT), short chain fatty acids (SCFA), branched chain fatty acids (BCFA), structured MAG, structured DAG, free fatty acids, bound fatty acids, esterified fatty acids phospholipids, lysophospholipids, sphingomyelin, ganglio sides, specialized pro-resolving mediators (SPMs), and mixtures thereof. The free fatty acids, esterified fatty acids, and/or the bound fatty acids can comprise one or more of linoleic acid (18:2n-6), alpha-linolenic acid (18:3n-3), dihomogammalinolenic acid (20:3n-6), gamma-linolenic acid (GLA, 18:3n-6), stearidonic acid (18:4n-3), or docosapentaenoic acid (DPA, 22:5n-3). The fatty acid profile of the lipid fraction can mimic the profile present in edible oils such as Soybean oil, Canola oil, Sunflower oil or a mixture of edible oils. In an embodiment, the free fatty acids can be in encapsulated form or in a micellar form.

In an embodiment, the composition has a total carbohydrates consisting essentially of one or more of monosaccharides, di-saccharides, slowly digested fully caloric carbohydrates, or oligosaccharides or a mixture of thereof.

In an embodiment, the composition does not contain any intact gum and does not contain added stabilizer.

In an embodiment, the composition comprises vitamins and minerals.

In an embodiment, the composition is administered orally or as a tube feed.

In an embodiment, the method further comprises detecting the EPI in the patient before the administering of the composition to the patient.

In an embodiment, the MAG is at least about 25 wt. % of the total fat, preferably at least about wt. 40% of the total fat, more preferably at least about wt. 40% of the total fat, such as at least about 50 wt. % of the total fat, at least about 60 wt. % of the total fat or at least about 75 wt. % of the total fat. The total fat can consist of the MAG.

In an embodiment, the total fat does not contain any MCT.

In an embodiment, the composition comprises the MAG in an amount of about 10 to about 50 g/L of the composition.

In an embodiment, the total fat further comprises MCT in an amount of about 20 to about 60 g/L of the composition.

In an embodiment, the total fat comprises a combination of MCT and MAG. The total fat can consist of the combination of the MCT and the MAG.

In an embodiment, the total fat comprises a combination of free fatty acids and the MAG. The total fat can consist of the combination of the free fatty acids and the MAG. Optionally the total fat does not contain any MCT. The free fatty acids may be esterified or bound.

In an embodiment the total fat may further comprise LCT in an amount up to about 30% of the total fat, preferably up to about 20 wt % of the total fat.

In an embodiment, the total fat comprises a combination of MCT, MAG and LCT. The total fat can consist of the combination of the MCT, the LCT and the MAG.

In an embodiment the total fat comprises MAG in an amount from about 20 wt % to about 80 wt % of the total fat, MCT in an amount from 20 wt. % to about 80 wt. %, and LCT in an amount up to about 30 wt. % of the total fat, such as from about 10 wt. % to about 30 wt % of the total fat.

In an embodiment, the total fat contains less than about 20 wt % LCT, preferably less than about 10 wt % of LCT, more preferably less than about 5 wt. % LCT. In an embodiment, the total fat does not contain an LCT component.

In another embodiment, the present disclosure provides a method of making a nutritional composition effective for treating exocrine pancreatic insufficiency, the method comprising performing heat treatment of a mixture comprising pre-digested macronutrients.

In an embodiment, the heat treatment comprises ultra-high temperature treatment (UHT).

In an embodiment, the method further comprises forming the pre-digested macronutrients by performing hydrolysis or distillation of protein and/or fat. As a non-limiting example, the hydrolysis of protein and/or fat can comprise enzyme hydrolysis of protein to form extensively hydrolyzed protein. Additionally or alternatively, the hydrolysis of protein can comprise chemical hydrolysis, for example by alkali such as NaOH or acids such as HCl, and in some embodiments, hydrolysis by other methodologies such as fermentation or filtration. The hydrolysis of protein and/or fat can comprise enzyme hydrolysis of fat to form hydrolyzed fat consisting essentially of monoacylglycerols (MAG) and fatty acids.

In an embodiment, the method further comprises increasing the pH of the mixture by adding a pH-adjusting agent during at least one time selected from the group consisting of (i) before the aseptic treatment, (ii) during the aseptic treatment, and (ii) after the aseptic treatment but before packaging of the nutritional composition.

In an embodiment, the mixture comprises a total carbohydrate consisting essentially of at least one of maltodextrin, high-maltose syrup, slowly digested carbohydrates, monosaccharides, or di-saccharides.

In another embodiment, the present disclosure provides a nutritional composition effective for treating exocrine pancreatic insufficiency, the composition having a total protein consisting essentially of hydrolyzed protein and a total fat comprising monoacylglycerols (MAG) that are at least about 20 wt. % of the total fat, preferably at least 30% of the total fat, more preferably at least about 40 wt % of the total fat, and optionally the total fat further comprises medium chain triglycerides (MCT), and/or fatty acids. The composition can be selected from the group consisting of a tube feed, a food product, a food supplement, an oral nutritional supplements (ONS), a medical food, and combinations thereof. Optionally at least a portion of the hydrolyzed protein can be extensively hydrolyzed protein.

An advantage of one or more embodiments provided by the present disclosure is to address the needs of patients with exocrine pancreatic insufficiency (EPI).

Another advantage of one or more embodiments provided by the present disclosure is a shelf-stable nutritional composition for patients with EPI.

Yet another advantage of one or more embodiments provided by the present disclosure is effective digestion or use of pre-digested macromolecules, e.g., protein and fat.

Another advantage of one or more embodiments provided by the present disclosure is to use enzyme hydrolysis to yield high levels of di- and tri-peptides from one or more of dairy protein, plant protein, in vitro-grown protein, fermented protein, insect protein, microalgae protein, or mixtures thereof.

Yet another advantage of one or more embodiments provided by the present disclosure is to address the problem that pre-digested ingredients lead to separation, instability and quality issues, as well as taste, by providing a stable suspension without using intact gums and stabilizers.

An advantage of one or more embodiments provided by the present disclosure is to change one or more of the pH (preferably increase), the temperature, or the holding time at which the composition is sterilized to thereby increase product stability, for example a pH ranging from 4-9; a temperature from 120° F. to 450° F., and a holding time of 2 seconds to 15 minutes; preferably a pH between 6.5 to 7.5, a temperature from 250° F. to 350° F., and a holding time of 2 seconds to 2 minutes.

Another advantage of one or more embodiments provided by the present disclosure is a nutritional product specifically designed for EPI, for example Cystic Fibrosis (CF).

Yet another advantage of one or more embodiments provided by the present disclosure is to improve the quality of life (QoL) of EPI patients.

Additional features and advantages are described in, and will be apparent from, the following Detailed Description.

DETAILED DESCRIPTION

Definitions

Some definitions are provided hereafter. Nevertheless, definitions may be located in the "Embodiments" section below, and the above header "Definitions" does not mean that such disclosures in the "Embodiments" section are not definitions.

All percentages expressed herein are by weight of the total weight of the composition unless expressed otherwise. Where "energy percentage" or "en. %" are expressly used, the value is the amount of kcal provided by the referenced component in a given amount of the composition relative to the total kcal of the given amount of the composition. For example, "30 en. % protein" means that the protein in the composition provides an amount of kcal that is 30% of the total energy of the composition in any serving thereof.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used in this disclosure and the appended claims, the singular forms "a," "an" and "the" include plural referents unless the context clearly dictates otherwise. Thus, for example, reference to "a component" or "the component" includes two or more components.

The words "comprise," "comprises" and "comprising" are to be interpreted inclusively rather than exclusively. Likewise, the terms "include," "including" and "includes" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified. A composition "consisting essentially of" contains at least about 50 wt %, preferably at least about 60 wt. % of the referenced components, more preferably at least about 75 wt. % of the referenced components, even more preferably at least about 85 wt. % of the referenced components, and most preferably at least about 95 wt. % of the referenced components. Any embodiment disclosed herein can be combined with any other embodiment disclosed herein.

The term "and/or" used in the context of "X and/or Y" should be interpreted as "X," or "Y," or "X and Y." Similarly, "at least one of X or Y" should be interpreted as "X," or "Y," or "X and Y." For example, "at least one mono-glyceride or di-glyceride" should be interpreted as "a mon-glyceride" or "a di-glyceride," or "both a mono-glyceride and a di-glyceride."

Where used herein, the terms "example" and "such as," particularly when followed by a listing of terms, are merely exemplary and illustrative and should not be deemed to be exclusive or comprehensive. As used herein, a condition "associated with" or "linked with" another condition means the conditions occur concurrently, preferably means that the conditions are caused by the same underlying condition, and most preferably means that one of the identified conditions is caused by the other identified condition.

The terms "food," "food product" and "food composition" mean a product or composition that is intended for ingestion by an individual such as a human and provides at least one nutrient to the individual. A food product typically includes at least one of a protein, a lipid, a carbohydrate and optionally includes one or more vitamins and minerals. The compositions of the present disclosure, including the many embodiments described herein, can comprise, consist of, or consist essentially of the elements disclosed herein, as well as any additional or optional ingredients, components, or elements described herein or otherwise useful in a diet.

The term "enteral" as used herein refers to administration through the alimentary tract. A skilled artisan recognizes that this administration may be within the intestine, which is the tube passing from the stomach to the anus divided into the small intestine and large intestine, through the mouth, through a nasogastric tube into the stomach, and other means known in the art.

As used herein, a "tube feed" is preferably a complete or incomplete nutritional products that are administered to an animal's gastrointestinal system, other than through oral administration, including but not limited to a nasogastric tube, orogastric tube, gastric tube, jejunostomy tube (J-tube), percutaneous endoscopic gastrostomy (PEG), a port (such as a chest wall port that provides access to the stomach), jejunum and other suitable access ports.

Ultra high temperature ("UHT") heat treatment is heat treatment at a temperature of about 140° C. to about 151° C. for a time period of about 2 seconds to about 15 seconds, for example about 140° C. to about 145° C. for about 3 seconds to about 12 seconds, in a specific non-limiting example about 6 seconds at about 140° C.

A "stable" composition substantially maintains its viscosity and does not undergo destabilization such as phase separation, e.g. layering and/or sedimentation, for at least 24 hours of storage at 25° C., preferably at least one week of storage at 25° C., more preferably at least one month of storage at 25° C., even more preferably at least two months of storage at 25° C., most preferably 12-24 months of storage at 25° C.

A "subject" or "individual" is a mammal, preferably a human. "Prevention" includes reduction of risk, incidence and/or severity of a condition or disorder. As used herein, an "effective amount" is an amount that prevents a deficiency, treats a disease or medical condition in an individual, or, more generally, reduces symptoms, manages progression of the disease, or provides a nutritional, physiological, or medical benefit to the individual.

The terms "treatment" and "treat" include both prophylactic or preventive treatment (that prevent and/or slow the development of a targeted pathologic condition or disorder) and curative, therapeutic or disease-modifying treatment, including therapeutic measures that cure, slow down, lessen symptoms of, and/or halt progression of a diagnosed pathologic condition or disorder; and treatment of patients at risk of contracting a disease or suspected to have contracted a disease, as well as patients who are ill or have been diagnosed as suffering from a disease or medical condition. The terms "treatment" and "treat" do not necessarily imply that a subject is treated until total recovery. The terms "treatment" and "treat" also refer to the maintenance and/or promotion of health in an individual not suffering from a disease but who may be susceptible to the development of an unhealthy condition. The terms "treatment" and "treat" are also intended to include the potentiation or otherwise enhancement of one or more primary prophylactic or therapeutic measures. As non-limiting examples, a treatment can be performed by a patient, a caregiver, a doctor, a nurse, or another healthcare professional.

The term "unit dosage form", as used herein, refers to physically discrete units suitable as unitary dosages for human and animal subjects, each unit containing a predetermined quantity of the composition disclosed herein in an amount sufficient to produce the desired effect, in association with a pharmaceutically acceptable diluent, carrier or vehicle. The specifications for the unit dosage form depend on the particular compounds employed, the effect to be achieved, and the pharmacodynamics associated with each compound in the host.

As used herein, "complete nutrition" are preferably nutritional products that contain sufficient types and levels of macronutrients (protein, fats and carbohydrates) and micronutrients to be sufficient to be a sole source of nutrition for the animal to which it is being administered to.

As used herein, "incomplete nutrition" are preferably nutritional products that do not contain sufficient levels of macronutrients (protein, fats and carbohydrates) or micronutrients to be sufficient to be a sole source of nutrition for the animal to which it is being administered to.

As used herein a "partially hydrolyzed" protein is in one in which 60% of the protein/peptide population has a molecular weight of less than 1000 Daltons, whereas an "extensively hydrolyzed" protein is one in which at least 90% of the protein/peptide population has a molecular weight less than 3 kDa, for example in a range of 5% to 95% hydrolyzed.

A triglyceride (also known as a triacylglycerol or a triacylglyceride) is an ester that is derived from glycerol and three fatty acids. Pancreatic triglyceride lipase (PTL) is the primary lipase that hydrolyzes dietary TAG molecules in the human digestive system to convert TAG to diacylglycerols (DAG) and ultimately to monoacylglycerols (MAG) and free fatty acids. Fatty acids may be either unsaturated or saturated. Fatty acids which are not attached to other molecules are referred to as free fatty acids (FFA).

A medium-chain triglyceride (MCT) is a triglyceride in which all three fatty acid moieties are medium-chain fatty acid moieties. As defined herein, medium-chain fatty acids (MCFA) are fatty acids that have 6 to 12 carbon atoms.

A long-chain triglyceride (LCT) is a triglyceride in which all three fatty acid moieties are long-chain fatty acid moieties. As defined herein, long-chain fatty acids (MCFA) are fatty acids that have 14 to 26 carbon atoms.

Embodiments

The present disclosure provides nutritional compositions in which at least a portion of the macronutrients are in a pre-digested form and/or in a form that does not require use of pancreatic enzymes for digestion. Preferably, the composition has a total protein consisting essentially of hydrolyzed protein and a total fat comprising monoacylglycerols (MAG) that are at least about 30 wt. % of the total fat, and optionally the total fat further comprises medium chain triglycerides (MCT) and/or fatty acids. Optionally at least a portion of the hydrolyzed protein can be extensively hydrolyzed protein.

In an embodiment, the MAG can provide all fatty acids found in edible oil (e.g., soy oil) in order to deliver an effective amount of essential fatty acids. Further in this regard, the fat source of the compositions disclosed herein is formulated to provide the necessary lipids to the patient, including all the essential fatty acids and to provide the lipids in a fatty acid profile that approaches that of a normal oil. Accordingly, in the context of the present disclosure, the fatty acids provided in the form of MAG are the fatty acids found in natural oil/fat sources. In particular, the MAGs according to the present disclosure include MAGs of the essential fatty acids linoleic acid and linolenic acid. EPI patients sometimes have compromised liver function, thus there are other fatty acids that they may not be able to synthesize, and therefore the fatty acid of a complete edible oil, e.g. soy oil, is preferred herein. The fat source can be, e.g., a mix of animal and plant fat. The MAGs provide the essential fatty acids, and thus a preferred embodiment of the composition also provides an effective amount of unsaturated fatty acids, e.g., oleic acid, and a lower level of saturated fatty acids, e.g., palmitic and stearic acids. The MAGs can optionally include MAG-EPA and/or MAG-DHA.

Still further in this regard, a preferred embodiment of the composition comprises MAG having a fatty acid distribution substantially similar to that of soy oil, but in the form of MAG. For example, the MAG can have a fatty acid distribution that is up to 1.0 wt. % Myristic Acid (C14:0), 10.0 to 13.0 wt. % Palmitic Acid (C16:0), 3.0 to 6.0 wt. % Stearic Acid (C18:0), 21.0 to 28.0 wt. % Oleic Acid (C18.1), 48.0 to 56.0 wt. % Linoleic Acid (C18:2), 6.0 to 11.0 wt. % α-Linolenic Acid (C18:3), and up to 1.0 wt. % Arachidic Acid (C20:0), relative to the total fatty acids.

In an embodiment, the MAG is at least 25 wt. % of the total fat, preferably at least 30 wt. % of the total fat. In an embodiment, the MAG is at least 40 wt. % of the total fat, such as at least 50 wt. % of the total fat, at least 60 wt. % of the total fat or at least 75 wt. % of the total fat. The total fat can consist of the MAG. As non-limiting examples, the composition can comprise the MAG in an amount of about 10 to about 50 g/L of the composition, preferably about 20 to about 40 g/L of the composition, for example about 30 g/L of the composition.

In some embodiments, a combination of MAG and free fatty acids (optionally esterified, as an emulsion, as micelles, and/or bound) can be at least about 50 wt. % of the total fat, preferably at least about 75 wt. % of the total fat, more preferably at least about 85 wt. % of the total fat, and most preferably at least about 95 wt. % of the total fat, such as the total fat consisting of the combination of MAG and free/esterified fatty acids.

Optionally, the total fat of the composition can have less than 1.0 wt. % MCT relative to the total fat, such as no MCT in the composition, particularly in the embodiments discussed above that employ a combination of MAG and free fatty acids. Nevertheless, in some embodiments, the total fat can optionally further comprise MCTs in addition to the MAG. A non-limiting example of such an embodiment has total fat that is about 40 wt. % MAG) and about 60 wt. % MCT. For example, a combination of MAG and MCT can be at least about 50 wt. % of the total fat, preferably at least about 75 wt. % of the total fat, more preferably at least about 85 wt. % of the total fat, and most preferably at least about 95 wt. % of the total fat, such as the total fat consisting of the combination of MAG and MCT.

In some embodiments, the amount of LCTs (if any) is about 10 to about 60 g/L of the composition, preferably about 10 to about 40 g/L of the composition. Optionally, the total fat of the composition can have less than 5.0 wt. % LCT relative to the total fat, preferably less than 1.0 wt % LCT relative to the total fat, such as no LCT in the composition, particularly in the embodiments discussed above that employ a combination of MAG and free fatty acids. Nevertheless, in some embodiments, the total fat can optionally further comprise LCTs in addition to the MAG. A non-limiting example of such an embodiment has total fat that is about 25% wt. % MAG, about 45 wt. % MCT and about 30 wt. % LCT. For example, a combination of MAG, MCT and LCT can be at least about 75 wt. % of the total fat, preferably at least about 85 wt. % of the total fat, more preferably at least about 95 wt. % of the total fat, such as the total fat consisting of the combination of MAG, MCT and LCT. In some embodiments, the amount of LCTs (if any) is about 10 to about 60 g/L of the composition, for example about 20 to about 40 g/L of the composition.

In an embodiment, the nutritional composition has a macronutrient profile (e.g., before and/or after aseptic treatment) comprising at least one of:
  (i) an energy density of 1.0-2.5 kcal/ml, for example 1.0-2.0 kcal/ml, such as 1.0-1.5 kcal/ml;
  (ii) the total fat is about 10 to about 90 en. % of the composition; for example a total fat that is about 40 en. % (e.g., in a 1.5 kcal/ml composition), and in a particular embodiment, about 70 g/L of the composition,
  (iii) an amount of MCT that is about 1.0 wt. % to about 10.0 wt. %, preferably about 2.0 wt. % to about 6.0 wt. %, more preferably about 3.0 wt. % to about 5.0 wt. %, most preferably about 4.0 wt. %, and in a particular embodiment about 40 g/L;
  (iv) an amount of MAG that is about 0.1 wt. % to about 10.0 wt. %, preferably about 0.5 wt. % to about 4.0 wt. %, more preferably about 1.0 wt. % to about 3.0 wt. %, most preferably about 2.0 wt. %, and in a particular embodiment, about 30 g/L;
  (v) the total fat consists essentially of MAG, e.g., the total fat consists of MAG;
  (vi) a total protein that is about 5 to about 25% en. % of the composition; for example, a total protein that is about 12 en. % (e.g., in a 1.5 kcal/ml composition), and in a particular embodiment, about 45 g/L of the composition;
  (vii) the total protein consists essentially of extensively hydrolyzed protein;
  (viii) a total carbohydrates that is about 5 to about 85 en. % of the composition; for example, a total carbohydrates that is about 48 en. % (e.g., in a 1.5 kcal/ml composition), and in a particular embodiment, about 80 g/L;
  (ix) the carbohydrates consist essentially of one or more of (a) maltodextrin, maltose, and/or high-maltose corn syrup (e.g., about 50 wt. % of the carbohydrates and/or about 90 g/L of the composition), (b) maltotriose (e.g., about 25 wt. % of the carbohydrates and/or about 45 g/L of the composition), (c) sucrose (e.g., about 25 wt. % of the carbohydrates and/or about 45 g/L of the composition), (d) fructose, (e) galactose and (f) lactose, and optionally slowly digested carbohydrates such as isomaltulose.

In some embodiments, the composition comprises at least two of these characteristics (i)-(ix); preferably at least three of these characteristics (i)-(ix); more preferably at least four of these characteristics (i)-(ix), for example, at least five of these characteristics (i)-(ix), at least six of these characteristics (i)-(ix), at least seven of these characteristics (i)-(ix), and most preferably all eight of these characteristics (i)-(ix).

Preferably the composition is stable. To obtain commercial sterility, food products are treated at Ultra High Temperature (UHT) and then subsequently packaged under aseptic conditions. Example: retorting in cans and aseptic packaging in flexible packaging materials. Indirect or direct UHT systems may be applied, such as one or more of indirect steam injection, direct steam injection, or steam infusion.

The nutritional composition preferably further comprises vitamins and/or minerals. Non-limiting examples of suitable vitamins include vitamin C and group B vitamins, and other non-limiting examples of suitable vitamins include ascorbic acid, ascorbyl palmitate, vitamins B1, B2, B6, B12, and Niacin (B3), or combination of thereof. The vitamins may also include Vitamins A, D, E and K and acid vitamins such as pantothenic acid, folic acid and biotin. The Vitamin A may be present as Vitamin A Palmitate and/or beta-carotene. Vitamin D3 is an example of a suitable form of Vitamin D, and Vitamin D2 can also be used in some embodiments.

Non-limiting examples of suitable minerals include calcium, magnesium, iron or a combination thereof. The source of calcium can include calcium carbonate, calcium phosphate, calcium citrate, other insoluble calcium compounds or a combination thereof. The source of magnesium can include magnesium phosphate, magnesium carbonate, magnesium hydroxide or combination of thereof. The source of iron can include iron ammonium phosphate, ferric pyrophosphate, ferric phosphate, ferrous phosphate, other insoluble iron compounds, amino acids, iron chelating compounds such as EDTA, or combinations thereof. The minerals may also include zinc, iodine, copper, phosphorus, manganese, potassium, chromium, molybdenum, selenium, nickel, tin, silicon, vanadium and boron.

Preferably, at least a portion of the total protein is a pre-digested protein fraction, and the pre-digested protein fraction can comprise one or more of di-peptides; tri-peptides; free amino acids; small levels of larger peptides (i.e., at least four amino acids therein) or intact proteins, such as less than about 20 wt. % of the total protein, preferably less than about 10 wt. % of the total protein, more preferably less than about 5 wt. % of the total protein, most preferably less than about 1 wt. % of the total protein; or a mixture of peptides in different sizes and free amino acids. The protein may comprise one or more of animal protein, plant protein, fermented protein, in vitro-grown protein, fermented protein, insect protein, microalgae protein, or mixtures thereof.

In an embodiment, the total protein is 0-30 wt. % peptides larger than 5.0 kD, 0-25 wt. % peptides that are 2.5-5.0 kD, 0-40 wt. % peptides that are 1.0-2.5 kD, 10-40 wt. % peptides that are 0.6-1.0 kD, and 5-75 wt. % of peptides less than 0.6 kD, relative to the total protein.

In an embodiment, di- and tri-peptides are about 50 to about 95 wt. % of the total protein, for example about 95 wt. % of the protein.

Preferably, at least a portion of the total fat is a lipid fraction comprising one or more of monoacylglycerols (MAG), diacylglycerol (DAG), long chain triglycerides (LCT), medium chain triglycerides (MCT), short chain fatty acids (SCFA), branched chain fatty acids (BCFA), structured MAG, structured DAG, fatty acids (free and/or bound, e.g., esterified to glycerol or as ethyl esters), phospholipids, lyso-phospholipids, sphingomyelin, gangliosides, specialized pro-resolving mediators (SPMs), or mixtures thereof. The fatty acids that are free and/or bound may include one or more of linoleic acid (18:2n-6), alpha-linolenic acid (18:3n-3), dihomogammalinolenic acid (20:3n-6), gamma-linolenic acid (GLA, 18:3n-6), stearidonic acid (18:4n-3), docosapentaenoic acid (DPA, 22:5n-3) or mixtures thereof. The source of the lipids may be one or more of animal, plant, fermented, microalgae, GMO, non-GMO or mixtures thereof.

The MAGs may be formed by lipase and/or another enzymatic or distillation process to yield high levels of MAGs in one or more of animal fat, plant-based fat, fermented fat, microalgae, or mixtures thereof. In an embodiment, the MAGs are at least about 30 wt. % of the total fat, preferably at least about 40 wt. % of the total fat. In an embodiment, the MAGs are about 30 to about 80 wt. % of the total fat, preferably about 40 to about 70 wt. % of the total fat. In an embodiment, MAGs are about 50 to about 95 wt. % of the total fat, for example about 95 wt. % of the total fat.

Preferably, at least a portion of the total carbohydrate is a carbohydrate fraction comprising one or more of mono-saccharides and/or di-saccharides (e.g., a high level thereof), slowly digested fully caloric carbohydrates, oligosaccharides, or mixtures thereof. In an embodiment, the total carbohydrate consists essentially of one or more of maltodextrin, maltose, high-maltose corn syrup, fructose, galactose, sucrose, lactose, slowly digested carbohydrates, or a mixture of thereof.

In some embodiments, the composition is substantially free of added gums and stabilizers, and in a particular embodiment, completely free. "Substantially free" means less than 1.0 wt. %, preferably less than 0.5 wt. %, more preferably less than 0.2 wt. %, most preferably less than 0.1 wt. %.

In each of the compositions and methods disclosed herein, the composition is preferably selected from the group consisting of a tube feed, a food product, including food additives, food ingredients, functional foods, dietary supplements, medical foods, nutraceuticals, oral nutritional supplements (ONS) or food supplements.

The composition can be administered to an individual having EPI, for example an individual with EPI from at least one condition selected from the group consisting of cystic fibrosis; acute pancreatitis (about 12% of such patients have EPI of some degree); chronic pancreatitis (the majority of such patients have EPI of some degree); gastrointestinal surgery such as gastric, duodenal or pancreatic surgery; surgeries involving the upper intestines and/or the lower intestines; or any procedure that leads to loss of postprandial synchrony or decreased pancreatic stimulation, preferably recently (e.g., within the prior year, for example within the prior month, such as within the prior week), for example partial gastrectomy or total gastrectomy (about 30-70% of such patients have EPI of some degree), pancreatic duodenectomy (the majority of such patients have EPI of some degree), or small pancreas resection (about 5% of such patients have EPI of some degree); the obstruction of and/or the loss of the pancreatic parenchyma induced by pancreatic cancer (the majority of such patients have EPI of some degree); celiac disease; Inflammatory Bowel Disease (IBD) such as Crohn's disease (about 35% of such patients have EPI of some degree) or ulcerative colitis (about 40-50% of such patients have EPI of some degree); liver disease; type I diabetes (about 25-74% of such patients have EPI of some degree), and type II diabetes (about 28-54% of such patients have EPI of some degree).

Acute pancreatitis can be caused by physical injury (e.g., bicycle handle-bar injuries or blunt trauma to the mid-upper abdomen), certain medications, gallstones, or problems in the anatomy of the ducts in the liver or pancreas. Non-specific symptoms of acute pancreatitis can include abdominal pain, vomiting and/or nausea. Acute pancreatitis can be diagnosed by high above normal levels of blood amylase and lipase (non-specific) and/or radio logic images showing pancreas inflammation.

Chronic pancreatitis can be caused by metabolic abnormality and/or another disease. Symptoms can include one or more of nausea, vomiting, weight loss, diarrhea and oily bowel movements, or poor growth. Diabetes generally takes many years to appear, but nevertheless some patients with chronic pancreatitis will develop diabetes in adolescence. Chronic pancreatitis is a lifetime condition, but symptoms come and go, and symptom severity may have ups and downs. Chronic pancreatitis can be diagnosed by one or more of irreversible damage to the pancreas, loss of digestive function, or diabetes. Currently, damage is assessed by CT or MRI scans of the pancreas, by special endoscopic procedures known as ERCP, or by endoscopic ultrasound. Currently, there are no effective medical treatments for patients with a genetic predisposition, but some patients are candidates for surgery, typically pancreatectomy with islet cell autotransplant. Chronic pancreatitis has an increased risk of pancreatic cancer.

In an embodiment, the method comprises determining that the individual has EPI, preferably before the initial administration of the composition. Direct methods for EPI detection are typically done in special centers, such as the cholecystokinin (CCK) test that measures the ability of the acinar cells to secrete digestive enzymes, and the secretin test that measures the ability of the ductal cells to secrete bicarbonate.

Non-limiting examples of indirect methods for EPI detection include:

The coefficient of fat absorption (CFA) test in which fat maldigestion is evaluated by the quantification of the CFA, which is approximately 90% in healthy subjects, while different indications will yield different CFA. In cystic fibrosis, the CFA is approximately 40%.

Qualitative tests such as the acid steatocrit test and Sudan III stain of stool, although these tests are less reliable.

Determination of fecal elastase and chymotrypsin (2 proteases produced by the pancreas). However, faecal elastase is a measure of pancreatic secretion and not directly EPI.

As an alternative, maldigestion secondary to gastroduodenal and pancreatic surgery can be accurately evaluated by an optimized 13C-mixed triglyceride (13C-MTG) breath test, although this test is not always available in clinical setting, Complete Blood Count (CBC) Test—Serum iron, vitamin B-12, and folate concentrations may help establish the diagnosis of EPI. Prothrombin time (PT) may be prolonged.

Other differential diagnosis tests: Carbohydrates test, D-xylose, Bile-salt absorption test.

In an embodiment, administration of the composition disclosed herein decreases or even eliminates any use of PERT in the individual, for example by decreasing a daily dose and/or a frequency of administration of an enzyme such as one or more of lipase (e.g., pancrelipase), protease or amylase.

For example, the composition disclosed herein can be administered to an EPI-afflicted individual for a time period, such as at least one week, at least one month, or at least one year; and a daily dose and/or a frequency of administration of an enzyme such as one or more of lipase (e.g., pancrelipase), protease or amylase can be less than that of the immediately preceding time period (e.g., the immediate one week prior, the immediate one month prior, or the immediate one year prior). In this regard, the daily dose and/or the frequency of administration of the enzyme during the time period of administration of the composition disclosed herein can be 75% or less relative to that in the immediately preceding time period, preferably 50% or less relative to that in the immediately preceding time period, more preferably 25% or less relative to that in the immediately preceding time period.

As another example, the composition disclosed herein can be administered to an EPI-afflicted individual who had been previously periodically administered an enzyme such as one or more of lipase (e.g., pancrelipase), protease or amylase (e.g., during the immediate one week prior, the immediate one month prior, or the immediate one year prior to initiating administration of the composition); and the administration of the enzyme can completely cease during the time period of administration of the composition disclosed herein, such as at least one week, at least one month, or at least one year.

The composition can be administered at least one day per week, preferably at least two days per week, more preferably at least three or four days per week (e.g., every other day), most preferably at least five days per week, six days per week, or seven days per week. The time period of administration can be at least one week, preferably at least one month, more preferably at least two months, most preferably at least three months, for example at least four months. In an embodiment, dosing is at least daily; for example, a subject may receive one or more doses daily. In some embodiments, the administration continues for the remaining life of the individual. In other embodiments, the administration occurs until no detectable symptoms of the medical condition remain. In specific embodiments, the administration occurs until a detectable improvement of at least one symptom occurs and, in further cases, continues to remain ameliorated.

The compositions disclosed herein may be administered to the subject enterally, e.g., orally or by tube feed. They are particularly appropriate for enteral use, such as oral administration, e.g. a ready-to-drink ("RTD") beverage or an Oral Nutritional Supplement, and/or tube feeding. Such compositions are conveniently administered in the form of an aqueous liquid.

For clinical applications, the nutritional composition is preferably in the form of a ready-to-use liquid formulation. In this form, the composition may be fed to a patient via a nasogastric tube, jejunum tube or by having the patient drink it, as non-limiting examples. The nutritional composition may also be in soluble powder form to be reconstituted with a liquid, e.g., water, prior to use.

The nutritional compositions may be formulated as complete nutrition or as incomplete nutrition. Preferably the compositions disclosed herein are nutritionally complete, i.e. include vitamins, minerals, trace elements as well as nitrogen, carbohydrate and fat and/or fatty acid sources so that they may be used as the sole source of nutrition supplying essentially all the required daily amounts of vitamins, minerals, carbohydrates, fat and/or fatty acids, proteins and the like. Accordingly, the compositions disclosed herein may be provided in the form of a nutritionally balanced complete meal, e.g. suited for oral or tube feeding, e.g., by means of nasogastric, nasoduodenal, esophagostomy, gastrostomy, or jejunostomy tubes.

The nutritional compositions may be administered as a bolus or a continuous tube feeding. In an embodiment, the nutritional compositions are administered as a bolus since it maximizes the physiological response to the feeding occasion. This method provides complete nutrition to a patient population since a concentrated dose of protein is delivered at each feeding. This concentrated provision of protein is essential to increasing plasma amino acids (e.g., leucine), stimulating protein synthesis, and attaining a net positive protein balance. This anabolic state post-feeding is required to optimize growth though the accrual of lean body mass and linear bone growth (accrual of bone mineral density). The mechanism is related to the above mentioned increase in serum leucine as well as anabolic endocrine response including the stimulation of the insulin-IGF-1-GH axis leading to increased uptake and bio-utilization of substrates for musculoskeletal development (thus, leading to reduced accumulation of visceral adiposity). In an embodiment, a complete feeding of the present nutritional compositions would be about 1000 ml for a pediatric patient that is from 1 to 13 years of age. Children older than age 13 and adults may benefit from such a formula, but caloric requirements along with macro-micronutrients needs should be evaluated to ensure optimal delivery of nutrition.

EXAMPLES

The following non-limiting examples present formulations of compositions for treating EPI and also an experimental example.

Example 1

| Ingredient | Amount (wt. %) |
| --- | --- |
| Whey Hydrolysate | 5.500 |
| Vegetable Oil MCTs | 3.970 |
| Monoglycerides | 2.377 |
| Maltodextrin | 14.000 |
| Isomaltulose Palatinose | 3.500 |
| Tripotassium Citrate | 0.220 |
| Choline Chloride | 0.060 |
| Trimagnesium Dicitrate | 0.180 |
| Potassium Chloride | 0.100 |
| Tricalcium Phosphate | 0.430 |
| Vitamin Mineral premix | 0.080 |
| Salt NaCl | 0.000 |
| Vitamin C Sodium Ascorbate | 0.012 |
| Disodium Phosphate Anhydrous | 0.170 |

Example 2

| Ingredient | Amount (wt. %) |
| --- | --- |
| Whey Hydrolysate | 5.500 |
| Vegetable Oil MCTs | 3.970 |
| Monoglycerides | 2.377 |
| Glucose Syrup 80% TS High Maltose | 16.100 |
| Isomaltulose (Palatinose) | 4.025 |
| Tripotassium Citrate | 0.220 |
| Choline Chloride | 0.050 |
| Trimagnesium Dicitrate | 0.180 |
| Potassium Chloride | 0.100 |
| Tricalcium Phosphate | 0.430 |
| Vitamin premix | 0.092 |
| Disodium Phosphate Anhydrous | 0.170 |
| Reverse osmosis water | To 100% |

Example 3

| Ingredient | Amount (wt. %) |
| --- | --- |
| Hydrolyzed Whey Protein Concentrate | 5.565 |
| Vegetable Oil MCTs | 4.100 |
| Monoglycerides | 2.455 |
| Maltodextrin | 13.800 |
| Isomaltulose (Palatinose) | 3.450 |
| Tripotassium Citrate | 0.300 |
| Choline Chloride | 0.057 |
| Trimagnesium Dicitrate | 0.180 |
| Potassium Chloride | 0.150 |
| Tricalcium Phosphate | 0.370 |
| Vitamin premix | 0.092 |
| Disodium Phosphate Anhydrous | 0.170 |
| Reverse osmosis water | To 100% |

Example 4

| Ingredient | Amount (wt. %) |
| --- | --- |
| Amino Acid Blend | 5.100 |
| Vegetable Oil MCTs | 4.100 |
| Monoglycerides | 2.455 |
| Maltodextrin | 14.100 |
| Isomaltulose (Palatinose) | 3.525 |
| Tripotassium Citrate | 0.370 |
| Choline Chloride | 0.057 |
| Trimagnesium Dicitrate | 0.180 |
| Potassium Chloride | 0.150 |
| Tricalcium Phosphate | 0.520 |
| Vitamin premix | 0.092 |
| Salt NaCl | 0.035 |
| Disodium Phosphate Anhydrous | 0.170 |
| Reverse osmosis water | To 100% |

Example 5

| Ingredient | Amount (wt. %) |
| --- | --- |
| Whey Hydrolysate | 6.00 |
| Vegetable Oil MCTs | 4.00 |
| Monoglycerides | 2.00 |
| Maltodextrin | 10.00 |
| Isomaltulose (Palatinose) | 3.50 |
| High maltose corn syrup | 16.00 |
| Mineral blend | 1.00 |
| Vitamin blend | 0.25 |
| Reverse Osmosis Water | 57.25 |

Example 6

| Ingredient | Amount (wt. %) |
| --- | --- |
| Whey Hydrolysate | 5.5 |
| Monoglycerides | 6.2 |
| Maltodextrin | 10.0 |
| Isomaltulose (Palatinose) | 3.5 |
| High maltose corn syrup | 16.0 |
| Mineral blend | 1.0 |
| Vitamin blend | 0.3 |
| Water | To 100% |

Example 7

| Ingredient | Amount (wt. %) |
| --- | --- |
| Amino Acid Blend | 5.100 |
| Vegetable Oil MCTs | 3.500 |
| Monoglycerides | 2.405 |
| Vegetable Oil LCTs | 0.650 |
| Maltodextrin | 14.100 |

-continued

| Ingredient | Amount (wt. %) |
| --- | --- |
| Isomaltulose (Palatinose) | 3.525 |
| Tripotassium Citrate | 0.370 |
| Choline Chloride | 0.057 |
| Trimagnesium Dicitrate | 0.180 |
| Potassium Chloride | 0.150 |
| Tricalcium Phosphate | 0.520 |
| Vitamin premix | 0.090 |
| Salt NaCl | 0.035 |
| Disodium Phosphate Anhydrous | 0.170 |
| Reverse osmosis water | To 100% |

Example 8

| Ingredient | Amount (wt. %) |
| --- | --- |
| Whey Hydrolysate | 5.550 |
| Vegetable Oil MCTs | 4.000 |
| Monoglycerides | 2.395 |
| Maltodextrin | 14.200 |
| Isomaltulose (Palatinose) | 3.525 |
| Reverse Osmosis Water | 69.900 |

The stability of this formulation was tested. Specifically, the whey hydrolysate powder was mixed in about half of the water (water at room temperature). The distilled monoglycerides and the MCTs were added and mixed well with a spatula, and the solution was much smoother after addition of the distilled monoglycerides. Then the isomaltulose (palatinose) and the maltodextrin was added and mixed well with a spatula. The remaining water was microwaved to warm and then added to the mixture.

The mixture was stable after 24 hours of storage at 25° C.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of treating exocrine pancreatic insufficiency (EPI), the method comprising administering to an individual in need thereof an effective amount of a nutritional composition having (1) a total protein consisting essentially of hydrolyzed protein and (2) a total fat comprising monoacylglycerols (MAG) that are at least about 30 wt % of the total fat, the total fat optionally further comprising medium chain triglycerides (MCT) and/or fatty acids, wherein the nutritional composition has an energy density of 1.0-2.0 kcal/ml.

2. The method of claim 1, the method comprising administering to the individual the nutritional composition having at least one characteristic selected from the group consisting of:
(i) an energy density of 1.0-1.5 kcal/ml;
(ii) the total fat that is about 10 to about 90 energy % of the nutritional composition;
(iii) an amount of medium chain triglycerides (MCT) that is about 1.0 wt % to about 10.0 wt % of the nutritional composition;
(iv) the MAG that are about 0.1 wt % to about 10.0 wt % of the nutritional composition;
(v) the total protein that is about 5 to about 50 energy % of the nutritional composition;
(vi) a total carbohydrates that is about 5 to about 85 energy % of the nutritional composition; and
(vii) the total carbohydrates that consist essentially of one or more of maltodextrin, maltose, maltotriose, sucrose, fructose, lactose, galactose, and high-maltose corn syrup, and optionally comprise slowly digested carbohydrates.

3. The method of claim 1, the method comprising administering to the individual the nutritional composition having the total fat further comprising an additional fat that is selected from the group consisting of diacylglycerols (DAG), long chain triglycerides (LCT), medium chain triglycerides (MCT), short chain fatty acids (SCFA), branched chain fatty acids (BCFA), structured MAG, structured DAG, free fatty acids, bound fatty acids, phospholipids, lysophospholipids, sphingomyelin, gangliosides, specialized pro-resolving mediators (SPMs), and mixtures thereof.

4. The method of claim 1, further comprising detecting the EPI in the patient before the administering the nutritional composition to the individual.

5. The method of claim 1, the method comprising administering to the individual the nutritional composition having the total fat comprising the MAG that is at least 40 wt % of the total fat.

6. The method of claim 1, the method comprising administering to the individual the nutritional composition having the total fat that comprises the MAG; and further comprises LCT in an amount from 10 wt % to 30 wt % of the total fat.

7. The method of claim 1, the method comprising administering to the individual the nutritional composition having the total fat that comprises the MAG; and further comprises less than 5.0 wt % LCT relative to the total fat.

8. The method of claim 1, the method comprising administering to the individual the nutritional composition having the total fat comprising a combination of free fatty acids and the MAG.

9. The method of claim 2, the method comprising administering to the individual the nutritional composition having at least one characteristic selected from the group consisting of: (i) an energy density of 1.0-1.5 kcal/ml; (ii) the total fat that is about 10 to about 90 energy % of the nutritional composition; (iii) an amount of the MCT that is about 1.0 wt % to about 10.0 wt % of the nutritional composition; (iv) the MAG that are about 0.1 wt % to about 10.0 wt % of the nutritional composition; (v) the total protein that is about 5 to about 50 energy % of the nutritional composition; (vi) a total carbohydrates that is about 5 to about 85 energy % of the nutritional composition; and (vii) the total carbohydrates that consist essentially of one or more of maltodextrin, maltose, maltotriose, sucrose, fructose, lactose, galactose, and high-maltose corn syrup, and optionally comprise isomaltulose.

10. A method of treating exocrine pancreatic insufficiency (EPI), the method comprising administering to an individual in need thereof an effective amount of a nutritional composition having (1) a total protein consisting essentially of hydrolyzed protein and (2) a total fat comprising monoacylglycerols (MAG) that are at least about 30 wt % of the total fat, the total fat further comprising medium chain triglycerides (MCT) and optionally comprising fatty acids, wherein the nutritional composition comprises characteristics of:
(i) an energy density of 1.0-2.5 kcal/ml;
(ii) the total fat that is about 10 to about 90 energy % of the nutritional composition;

(iii) an amount of the MCT that is about 1.0 wt % to about 10.0 wt % of the nutritional composition;
(iv) the MAG that are about 0.1 wt % to about 10.0 wt % of the nutritional composition;
(v) the total protein that is about 5 to about 50 energy % of the nutritional composition;
(vi) a total carbohydrates that is about 5 to about 85 energy % of the nutritional composition; and
(vii) the total carbohydrates that consist essentially of one or more of maltodextrin, maltose, maltotriose, sucrose, fructose, lactose, galactose, and high-maltose corn syrup, and optionally comprise slowly digested carbohydrates.

11. A method of treating exocrine pancreatic insufficiency (EPI), the method comprising administering to an individual in need thereof an effective amount of a nutritional composition having (1) a total protein consisting essentially of hydrolyzed protein and (2) a total fat comprising monoacylglycerols (MAG) that are at least about 30 wt % of the total fat, the total fat optionally further comprising medium chain triglycerides (MCT) and/or fatty acids, wherein the nutritional composition does not contain any phospholipids.

* * * * *